(No Model.) 2 Sheets—Sheet 1.
B. S. KOLL.
MEAT BROILER GAS STOVE.
No. 521,718. Patented June 19, 1894.
Fig. I.
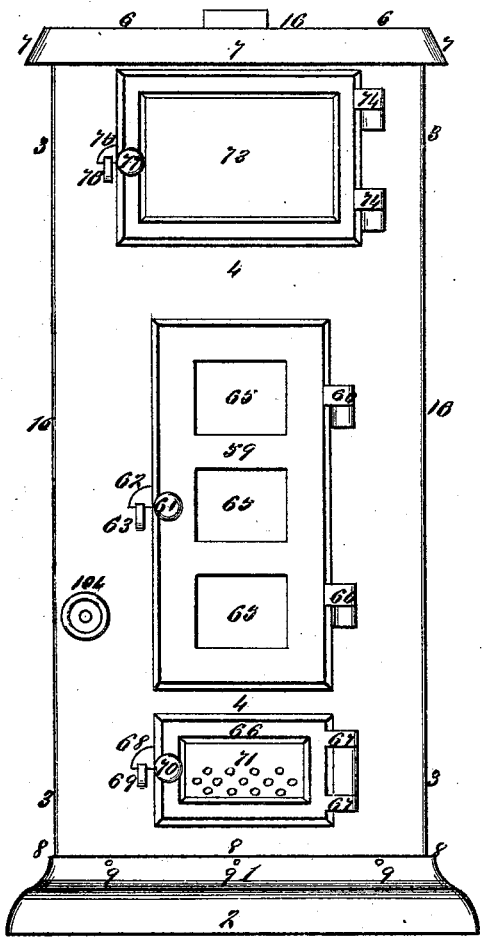
Fig. II.
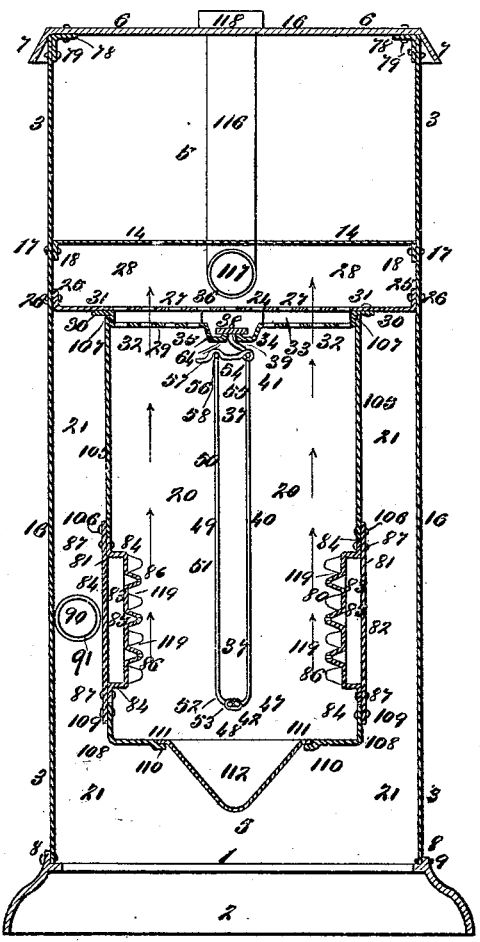
Fig. III.
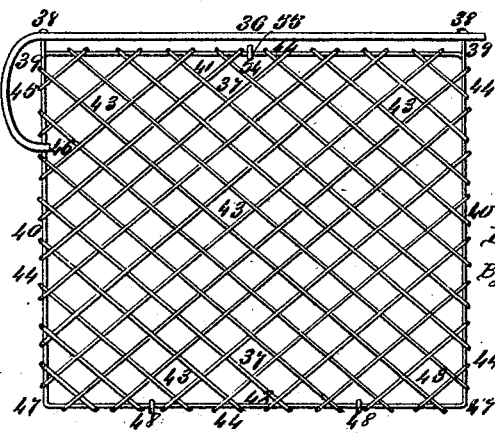
Attest:
Benj. H. Knight
Albert M. Ebersole
Inventor:
Benjamin S. Koll.
By Knight Bro's
Atty's.
THE NATIONAL LITHOGRAPHING COMPANY,
WASHINGTON, D. C.

(No Model.) 2 Sheets—Sheet 2.
B. S. KOLL.
MEAT BROILER GAS STOVE.
No. 521,718. Patented June 19, 1894.
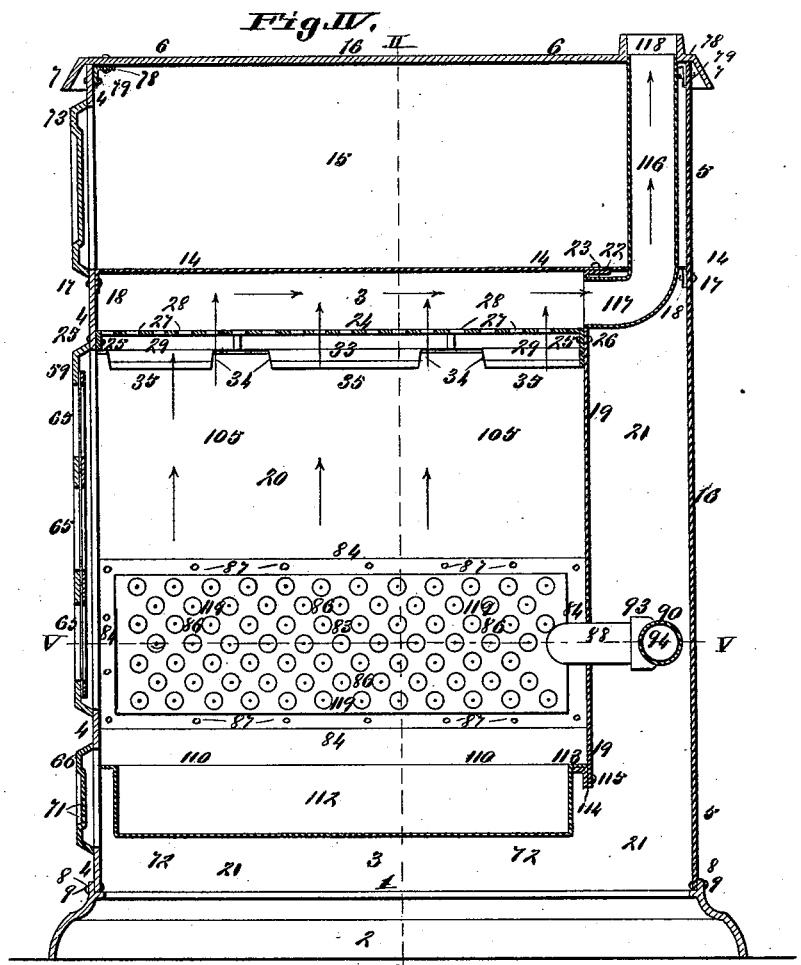
Fig. IV.
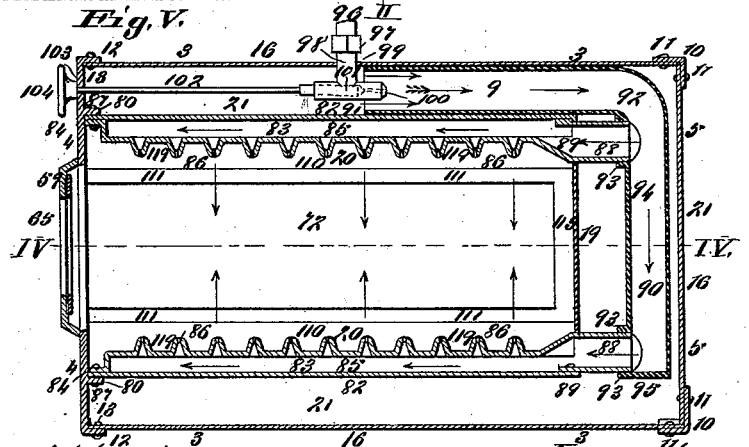
Fig. V.
Attest:
Benj<sup>n</sup> A. Knight
Albert M. Ebersole
Inventor:
Benjamin S. Koll.
By Knight Bro's.
att'ys.
THE NATIONAL LITHOGRAPHING COMPANY,
WASHINGTON, D. C.

UNITED STATES PATENT OFFICE.

BENJAMIN S. KOLL, OF ST. LOUIS, MISSOURI, ASSIGNOR, BY MESNE ASSIGNMENTS, TO LEWIS B. JONES, OF SAME PLACE.

MEAT-BROILER GAS-STOVE.

SPECIFICATION forming part of Letters Patent No. 521,718, dated June 19, 1894.

Application filed February 23, 1893. Serial No. 463,357. (No model.)

*To all whom it may concern:*

Be it known that I, BENJAMIN S. KOLL, of the city of St. Louis, in the State of Missouri, have invented a certain new and useful Improvement in Meat-Broiler Gas-Stoves, of which the following is a full, clear, and exact description, reference being had to the accompanying drawings, forming part of this specification.

This invention relates to a gas stove which has a suspended gas burner box, in which is mounted a duplex facing system of jet burners, between which burners is suspended a broiler rack in which is inclosed the steak, or other meat or fish, &c., in the course of broiling; the said broiler rack sliding, with its contents, on its suspension track, into and out of its cooking position. A sliding drip pan beneath receives the drip, and a warm closet above keeps the broiled provision warm in condition for serving on the table; and the invention consists in features of novelty hereinafter fully described and pointed out in the claims.

Figure I is a front elevation of the broiler stove, and shows the respective doors that give entrance into the aerating chamber, into the cook chamber and into the warm closet. Fig. II is a vertical section on line II—II, Fig. IV, and shows the pendent burner box, the duplex facing system of jet burners, the pendent broiler rack between said system of burners, the sliding drip pan, the warm-closet, and the hot air apertures, through which the warm air ascends from the cook chamber to the bottom and rear of the warm closet. Fig. III is a side view of the pendent broiler rack, and shows its sliding cap bar, and the handle by means of which it is inserted and withdrawn. Fig. IV is a vertical section, taken on line IV—IV, Fig. V, and shows the sliding drip-pan, the aerating and cook chambers, one of the duplex systems of burner jets, the gas supply aerating pipes that communicate with said jets, the pendent ceiling brackets, in which the slide bar of the broiler rack runs, and the warm closet; and Fig. V is a horizontal section, taken on line V—V, Fig. IV, and shows the cook chamber, the duplex facing system of burner jets, the gas supply pipe and valve, and the gas aerating pipes.

Referring to the drawings:—1 represents the platform-base of the stove, surrounded by its projecting foot flange 2, 3 its side plates, 4 its front plate, 5 its rear plate, and 6 its surmounting cap, which is surrounded by a pendent projecting collar 7.

8 is a vertical rim flange, that surrounds and surmounts the platform base 1, and which incloses the base of the side, rear and front plates. 9 are rivets by which, when preferred, said plates may be secured to said surmounting rim 8.

10 represents the perforate, vertical angle-brackets, that reinforce the rear corners of the stove box, effect an air tight joint of the same, and which brackets are secured to the rear and side plates by the rivets 11. The said rear and side plates are preferably constructed of sheet metal, and the said front plate of cast metal.

12 represents corner, integral angle flanges, that project rearward from the front-plate 4, and which angle flanges are secured by rivets 13 to the side plates 3.

14 represents the bottom plate of the warm-closet 15, which closet occupies the top of the stove box 16, and the said bottom is secured to said front, side and rear plates by rivets 17 that pass through the pendent, perforate flanges 18 of said bottom plate and through said front, side and rear plates.

19 represents the back-plate of the combustion chamber 20, which back plate is of tin, or the surface toward the combustion chamber is tinned, so as to constitute a return reflector of the rays from the burner jets. It also constitutes a partition wall between said combustion chamber 20, and the dead air chamber 21, which dead air chamber constitutes a non-conductor space, between said combustion chamber 20 and the side and rear plates, and also between said combustion chamber and the base plate 1 beneath, to husband the heat in said combustion chamber. The said back-plate reflector has a perforate angle flange 22 at top by means of which it is secured to the bottom plate 14 of the warm closet 15, by means of rivets 23.

24 represents the ceiling plate of the combustion chamber, the angle lugs 25 of which are secured to the side plates 3, the front plate 4 and to the back reflector plate 19 by the rivets 26. The said plate is provided with the hot air perforate vents 27, that provide an outlet for the exhaust hot air from the combustion chamber 20, into the final exhaust hot air chamber 28, where it is utilized to heat the warm closet 15.

29 represents a hanger plate, the double turn perforate bracket hanger ends 30 of which are secured to said ceiling plate by rivets 31. The bottom of said pendent hanger plate 29, is provided with perforations 32, through which the exhaust hot air passes on its way to said like perforations 27 in the ceiling plate 24, and the space between said hanger plate and said ceiling plate, which plates are thus located somewhat apart constitutes the initial exhaust hot air chamber 33.

34 represents a hanger turn longitudinal boxing in the middle of said hanger plate, in the middle of which boxing is provided a slot way 35 in which runs the head-bar 36 of the broiling rack 37. The rivet heads 38 of the shoulder turns 39 of the main parallel pendent bars 40 of said rack pass through and are riveted to said head-bar 36. A top coupling bar 41, connects said pendent bars, slightly below the head, and a foot coupling bar 42, connects said pendent bars at bottom; or said bars 40, and 42 may be integral and bent at right angles at the lower corners. Diagonal rods or wires 43 weave a loose wicker web, the hooked ends or turns 44 of the strands of which, weave around the bars 40, 41 and 42.

45 represents the integral handle that hangs pendent from said head-bar 36, and the bottom 46 of which handle grasps one of the parallel pendent bars 40. The said pendent bars 40 have inwardly projecting curve ankles 47, above the foot coupling bar 42, and link hinges 48 are mounted on said foot bar.

49 represents a hung wicket-gate that is constituted of the four sided frame bar 50 and wicket wire or rod web 51, and inwardly projecting curve ankles 52, above the foot or foot-bar 53 of said four sided frame bar 50, which foot-bar, like and in combination with the foot-bar of the main unswung side of said broiler frame are conjointly coupled by the aforesaid link hinges 48.

A drop holder latch 54 is mounted by its pivot loop 55 on the middle of the top coupling bar 41 of the unswung side of the broiler-frame, and said latch has a curve holder lock 56 and a trip lever 57 that engages with the top bar or head 58 of the swung side of the wicket frame, and locks the same when it is elevated into its closed position.

Now when steaks, chops, fish, or other provision are to be broiled the main furnace door 59 is swung open on its hinges 60 by means of the handle 61, which elevates the latch 62 out of its catch 63, and swings the door around. The cook then grasps the handle 45 of the broiler rack 37, either by a pothook or cloth, or other means for preventing the burning of the hand if said handle is hot, and by means of the handle the cook slides out the broiler frame, its head 36 running on the raised track 64 on each side of the slotway 35. The latch 57 is then raised, which releases the hung wicket-gate 49, so as to enable its being sufficiently lowered for the insertion of the steaks or other articles to be broiled, when said wicker-gate is again raised and itself trips the latch lever 57, so as to allow the top bar 58 of the wicket gate to again enter its lock seat 56 in the latch, which securely holds said gate of the broiler-frame closed. The loaded broiler frame is then slid back to its operative position within the stove.

65 represents mica plate panels in the door 59 that enable the cook to observe the progress of the broiling without opening said door.

66 represents the basement or aerating door of the stove, which door is hung on the hinges 67, and is fastened by the latch 68 that engages with the catch 69. 70 is the handle of said door, and 71 are open ports in said door that admit a free supply of air into the aerating basement chamber 72, into the gas aerating tubes and into the combustion chamber for the aeration of the gas previous to and in the course of combustion.

73 represents the door of the warm closet 15, which door is hung on the hinges 74, and is fastened by the latch 75, that engages in the catch 76, and is opened and closed by the handle 77. 78 is the angle-bracket around within the top of said warm closet, and which angle bracket is respectively secured to the top, sides, rear and front plates by the rivets 79.

80 represents integral, perforate lugs that project rearward from the back of the front plate 4.

81 are the duplex systems of jet burner boxes located within and on each side of the combustion chamber, and each of which comprises the back plate 82, and the front burner plate 83, the said burner plate having an angle flange bracket projection 84, that offsets said burner plate from said back plate all around sufficiently to constitute the gas supply chamber 85 between said two plates, which in each case supplies the series of burner jets 86 on each side of the combustion chamber, and 87 are the rivets that secure said projected, perforate flange 84 of said burner plate 83 to said back plate 82, and also at the front ends, to said perforate lugs 80, that project inward from said front plate.

88 represents gas reception tubes that are cast integral with, and at the rear ends of the respective burner plates 83, and the inner casing of said gas reception tube in each series of burner systems, is secured to the rear end of said back plate by the rivets 89.

90 represents the joint aerating tube that supplies both series of burner jets, the open entrance 91 to which tube is about midway between the front and rear end of the stove, on the side from which the gas supply is received, and said aerating gas tube runs back between the side plate 3 and the back plate 82 of the burner. As said aerating tube reaches rearward about on line with the rear end of the reception tubes 88, it angles round forming an elbow 92, and collars 93, 93, that severally project laterally from the angle branch 94 of said aerating tube and respectively embrace and discharge their supply of aerated gas into the rear ends of said reception gas tubes 88. One of said collars is located just past said elbow 92 and the other one close inside the terminal end plate 95 of said aerating tube.

96 represents the gas supply pipe which is connected by its coupling joint 97, with the T valve section tube 98, which tube passes through its tube perforate bed 99 in one of the side plates 3, and supplies its gas through the jet 100. The valve 101 in said T section tube is turned and adjusted to regulate the supply by the valve rod 102, which passes through its perforate bed-seat 103 in the front plate and is turned by the disk 104, to operate said valve.

105 represents combined reflector and partition plates, that separate the upper part of the combustion chamber on each side thereof from the non-conductor dead air chamber 21. The said plates are secured at their lower sides by rivets 106 to the back plates 82 of the jet burner and at their upper sides by the rivets 107 to the hanger ends 30 of the hanger plate 29. The said reflector plates are preferably made of tin, but may be metal plates that are especially tinned on the sides next the combustion chamber, or they may be constructed of bright galvanized iron, that is sufficiently bright to vividly reflect the rays from the burning jets onto the broiling material in the pendent rack 37, or of any other suitable material.

108 represents angle-plates, the upper perforate ends of which are secured to the lower perforate edges of the back plates 82 by rivets 109, and the inner lower edges of said angle-plates have depressed groove flanges 110, in and on which rest and slide the upper rim flanges 111 of the drip pan 112, the end flange 113 at the rear end of said drip-pan, when closed, rests on the angle-bracket support 114 that is secured by rivets 115 to the foot of the back plate 19. It will be seen that said drip-pan being below the combustion chamber, and directly beneath the broiling rack 37, catches all the drip from the broiling meat, and holds it in a comparatively cool position below the extreme heated portion of the combustion chamber above, and in close proximity to the cool air that freely enters through the perforations 71, in the basement aerating door 66. Therefore, unlike in baking and frying, and similar systems, the dripping is not burned and made rank by the application of extreme heat to the same, after it has exuded from the protection of the meat fiber, and come into direct contact with the hot bake pans and with the extreme hot products of combustion, also the continuous removal of said drip from contact with the broiling meat, (as soon as the cells that inclose said drip are burst,) facilitates the broiling action of said meat, so that unlike in said baking and frying systems, the meat by this broiling system is much more equably cooked to its center, without burning its exterior parts. Also unlike the usual practice in broiling, the drip is all both saved and perfectly preserved, instead of as in said usual practice being lost in the fire, and worse than lost, as the offensive odors that arise from the wasted, burned drip give evidence; and said odors also injure the flavor of the meat.

116 represents the exhaust flue, the foot elbow turn end 117 of which is tight jointed in the rear end of the exhaust hot air chamber 28, and the vertical section of said flue enters the surmounting collar 118, at the back of the top-plate or surmounting cap 6 of the stove, onto which collar the usual chimney flue is seated.

The operation of the device has been mostly explained in the introduction of the several parts, but to more concisely link a descriptive chain of some of the most important features of the operation it may be stated that the basement aerating door 66 is opened, and the drip-pan 112 is slipped into position on its rim flange seats 110 and 114. The furnace door 59 is opened and the broiling rack 37 is slid out on its raised track 64, and laid on its back on the cook's table. The trip lever 57 is then thrown back on its pivot loop hinge 55, and the hinged wicket gate 49 is opened out. The steak, chops, fish, or other material to be broiled is then placed on the wicket web back of the rack, and said front gate is again closed, and the curve holder lock 56 is then returned into engagement with the top bar of the wicket gate, by means of said lever 57, so as to lock the gate and hold the material to be broiled in position. The laden rack is then slid back on its bed-track in the stove, midway between the duplex systems of jet burner 81. The gas is then turned on by the partial rotation of the disk 104, that opens the supply valve to the adjusted degree for the use of the volume of gas required, and one or more of the lower tier of gas jets of each jet system on each side of the combustion chamber is ignited by a match, the flame spreading from jet to jet, throughout each system. The furnace door 59 is then closed, and the broiling process is in immediate full operation. During the broiling the condition of the meat or progress of the operation can be observed through the mica panels 65 in the door 59, and the gas valve can be adjusted to respectively increase or diminish the supply of gas to the jet systems, to increase or diminish the heat.

I have shown eighty gas jet nipples in each system which is about the preferred number for a medium sized stove, such as might be suitable for a medium sized restaurant, but I do not confine myself to that, or any particular number of said jets, as it is evident that the size of the stove and the consequent increase or decrease of the number of gas jet nipples in each of the duplex systems may be respectively diminished for a small family use, or increased on the other hand for large restaurants, eating houses and hotels.

I call attention to the aerating device in the gas supply tubes 90 and 88, and in the gas supply chamber 85 for the direct aeration of the gas, and the aerating devices in the combustion chamber; also the operation of my duplex systems of gas burner plates 83, with their associate systems of projecting gas jet nipples. In my first experiments, I merely perforated said plates for the issue of the gas jets, and capillary attraction, and the entire force of the rarefied draft being in front of said jets, the flames of the merely perforate jets were attracted to and sucked up the burner plates 83, so as to largely miss the object of the invention. Now, however, by the use of the above described system of projecting gas nipples, I produce an aerate current back of the jets, through the multiple channels 119 intermediate of said projecting gas nipples, which current is generated and enforced by the heat from the lighted gas jets, and in return forcibly project said jets toward the broiler rack to effect their work. The warm closet utilizes the exhaust products of combustion, ere they escape through the exhaust flue 116 to the chimney flue.

While I much prefer to construct and use my duplex gas supply chambers 85, for the direct supply of gas to the jet nipples, yet I do not confine myself to the use of said chamber, as said jets may be supplied by a duplex series on each side of individual gas pipes connecting with and supplied with aerated gas from the aerating gas tube 90, and said individual gas pipes running back of each row of jets and supplying the same. It will also be seen that by means of the aerating ports 71 in the basement door 66, I furnish an abundant supply of air for aerating the gas both before and during the process of combustion, and also for aerating the broiling provisions and ultimately by the air vents 32 in the hanger plate 29, and like air vents 27 in the ceiling plate 24, there is a complete ventilation and discharge of all odors into the exhaust chamber 28, and from that, *via* the exhaust flue 116 into the chimney. Thus it will be seen that no obnoxious odors can find vent into the house to the disgust of the residents.

The burner plates 83 are shown and described in their preferred, vertical position, but they may be inclined in either an overhung or underhung position.

I claim as my invention—

1. In a meat broiler stove, the combination of the inclosing plates of the stove, the ceiling plate 24 provided with the hot air vents 27, the perforate hanger plate 29, provided with the slot way 35 and having the raised track 64, the broiler rack 37, having the head 36 that runs on said track, and the duplex respectively facing systems of projecting jet burners 86; substantially as described.

2. In a meat broiler stove, the combination of the perforate ceiling plate 24, the perforate hanger plate 29, having the hanger longitudinal boxing 34, and raised track 64, provided with the slotways 35, the suspended hinged wicket broiler rack 37 having the head 36 that slides on said track, the drop holder latch 54 to said rack, the pendent reflector and partition plates 105, the duplex jet burner boxes, secured to said reflector plates, the duplex respectively facing series of jet burner nipples, the angle plates 108, having the groove flanges 110, and the sliding drip pan 112 having the rim flanges 111, that slide on said flanges 116; substantially as described.

3. In a meat broiler stove, the combination of the duplex vertical systems of jet burner boxes 81, the duplex series of projecting horizontal nipples, said respective series of nipples facing each other and forcing their products of combustion in direct contact with the broiling material, the vertical reflector plates 105 from which said burner boxes hang pendent, and the vertical combination back reflector and partition plate 19; substantially as described.

4. In a meat broiler stove, the combination of the duplex vertical systems of jet burner boxes, the duplex series of jet nipples mounted in said boxes, and said series facing toward each other, the reflector plates 19 and 105, the said reflector plates and stove casing plates providing the inclosure of the combustion chamber 20 provided with its draft channel 119, and of the dead air chamber 21, the gas supply pipe 96, the valve 101, the gas jet 100, the valve rod 102, the turn disk 104, the supply tubes 90, and 89, the angle plates 105, the drip-pan 112 and the broiling rack 37; substantially as described.

BENJAMIN S. KOLL.

In presence of—
BENJN. A. KNIGHT,
ALBERT M. EBERSOLE.